T. J. F. RYLAND.
VARIABLE SPEED FRICTION AND BELT GEARING.
APPLICATION FILED NOV. 28, 1914.
1,257,742.
Patented Feb. 26, 1918.
2 SHEETS—SHEET 1.
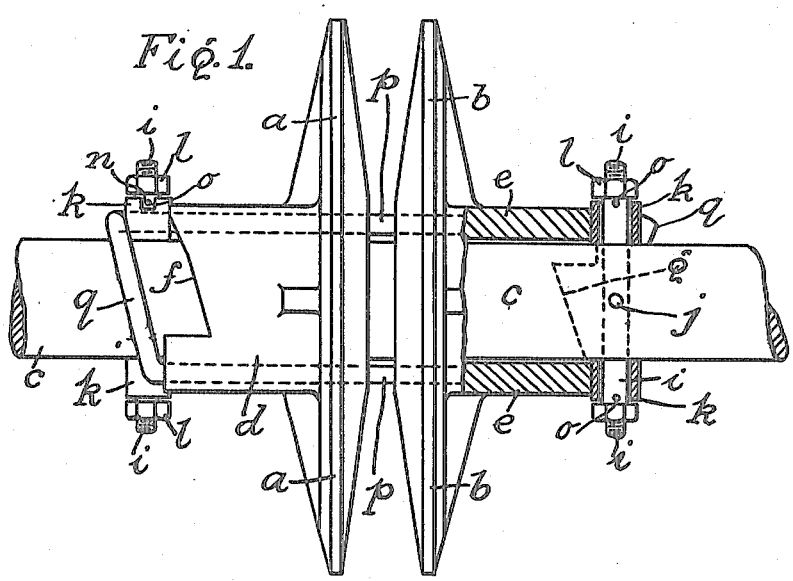
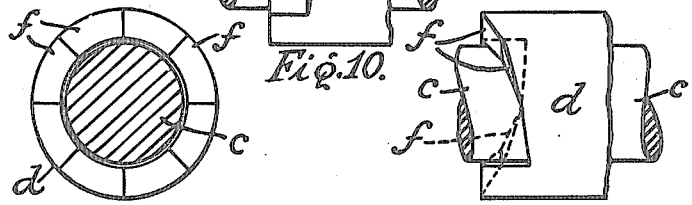
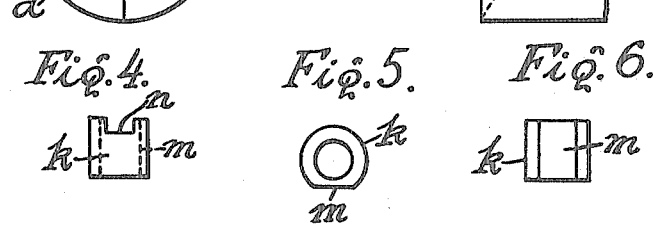
Witnesses.
Albert J Barnes.
Arthur Wreichlinger.
Inventor
T. J. F. Ryland
By H C Heide
Attorney.

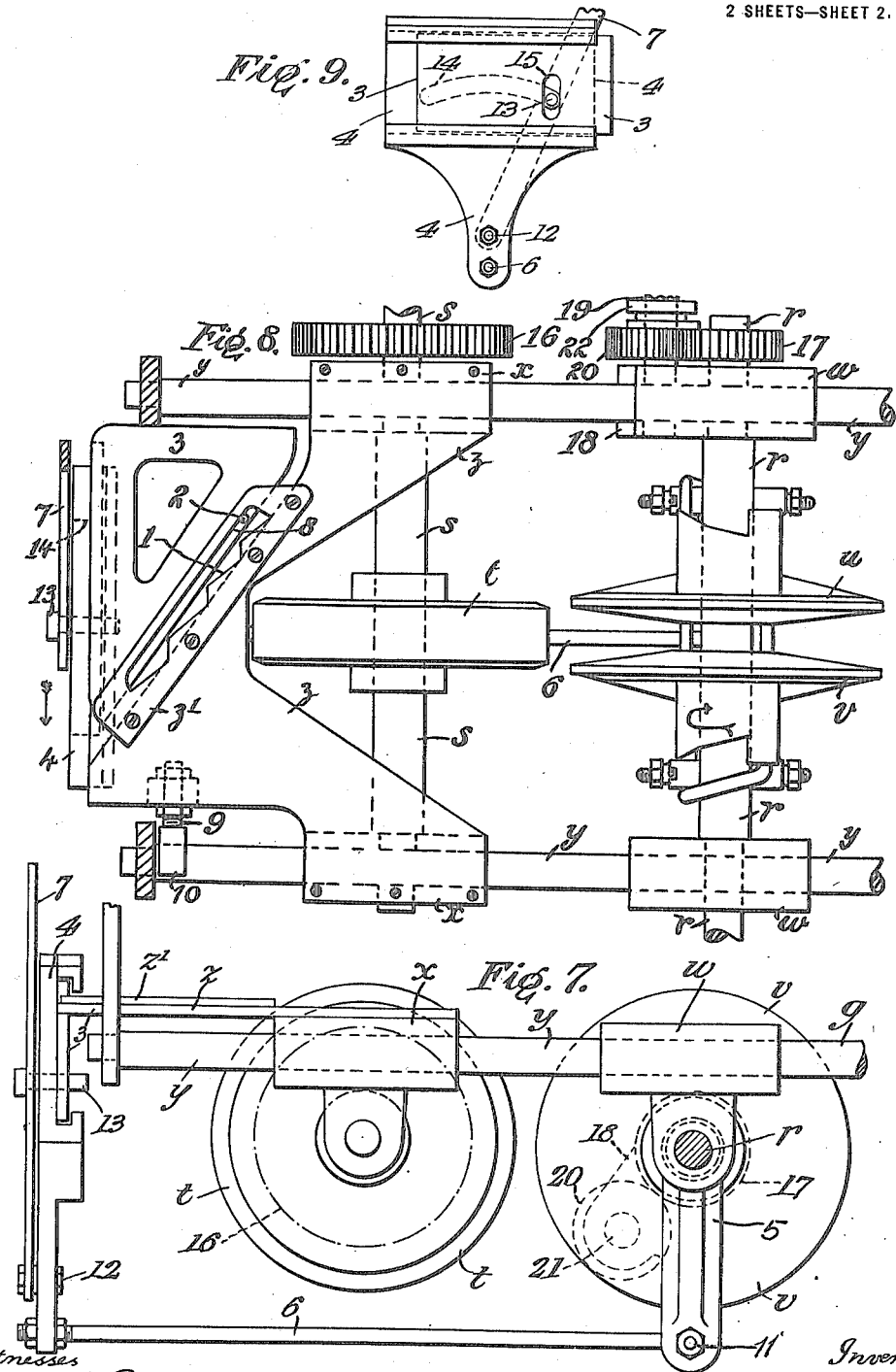

UNITED STATES PATENT OFFICE.

THOMAS J. F. RYLAND, OF LONDON, ENGLAND.

VARIABLE-SPEED FRICTION AND BELT GEARING.

1,257,742.

Specification of Letters Patent. Patented Feb. 26, 1918.

Application filed November 28, 1914. Serial No. 874,532.

*To all whom it may concern:*

Be it known that I, THOMAS JAMES FRANCIS RYLAND, a subject of His Majesty the King of England, residing at London, England, have invented certain new and useful Improvements Relating to Variable-Speed Friction and Belt Gearing, of which the following is a specification.

This invention comprises certain improvements in or relating to variable speed power transmission friction devices particularly of the type comprising friction members adapted to be automatically pressed against one another in accordance with the force transmitted and so arranged that the friction member or each of a number of such members which drives or is driven at varying diameters shall be constrained in movement on the shaft or the like upon which it is mounted by stops co-acting with cam grooves or surfaces formed so as to compensate for the varying effective diameters and preserve the end thrust pressing the members together at different working diameters at the desired amount to prevent slip.

Applications of the invention may be cited, *videlicit*, belt or rope pulleys, or friction devices comprising driving and driven shafts one of which shafts has mounted thereon a member comprising two component disks and the other has mounted thereon a disk or the like which frictionally engages the faces of the said component parts at a point which can be varied and which is situated between the two shafts, said component parts being constrained in movement on the shaft by stops co-acting with cam grooves or surfaces so that the disk and component parts frictionally engage with a power automatically adapted to vary to prevent slip.

By the present invention surface contact between the stop and co-acting cam groove or surface is realized whereby destruction of or injury to the cam groove or surface by the stop acting as a cutter or planing tool is prevented.

By the present invention also a greater responsiveness to the action of the cam groove or surface is obtainable.

According to the present invention the cam groove or surface is made in the form of a tandem series of helices which vary in pitch to correspond to a series of different working diameters, each helix being so pitched that at whichever of the different working diameters the device is adjusted to work, an end thrust of the required amount will be obtained to press the members together to prevent slip. Thus the surface with which the stop co-acts when the working diameter of the device is at the lowest, is more inclined to the axis of the shaft than the succeeding surfaces, each succeeding surface being more inclined than the next succeeding surface. And to co-act with this cam groove or surface a flat surfaced stop is provided in such movable relationship with the said friction member that its flat contacting surface automatically adjusts itself into parallelism with the differently pitched faces of the compound helical cam whereby at any setting of the device a sliding surface contact is gained and a successful drive thereby realized.

Further according to the present invention a greater responsiveness to the action of the cam groove or surface is secured by making the friction member or members somewhat unbalanced so that in starting any tendency of the stop or stops to carry the member or members idly around the shaft without pressing them into contact with the coöperating member is counteracted.

Further according to the present invention in cases where the constrained rotary friction member is desired to drive or be driven in either clockwise or anti-clockwise direction; for example, in the case of an automobile when it may be expedient to assist the braking appliances of the vehicle by the braking effect of engine compression, the tandem series of helices are preceded by a counter helical surface or a series of counter helical surfaces, whereby, if the companion friction member contacting with the first mentioned friction member is set at the position corresponding to the lowest effective diameter of the latter, and the direction of rotation is reversed, the constrained member will by virtue of the production of end thrust through the medium of the counter helical surface and its co-acting stop, be caused to press upon the companion friction member with the desired amount to prevent slip. It is to be understood that this provision of a counter helical surface or a series of such counter surfaces may be furnished in any application of the invention where facilities for driving in a reverse direction are desired.

An unbalanced condition of the friction member or members is not detrimental inasmuch as when running the interacting members are pressing against one another.

Conveniently and advantageously the invention may be carried into practice as shown in the accompanying drawings in more particular relation to a directing contacting disk embodiment.

In the drawings:—

Figure 1 is a part sectional front view.

Figs. 2 and 3 end and front views respectively of the cam surface of the device, and Figs. 4, 5 and 6 detail views thereof.

Fig. 7 is a side view.

Fig. 8 a plan view, and

Fig. 9 a detail of the drive.

Fig. 10 is a front view of a form of cam surface suited also for driving in a reverse direction.

A pulley or one of the members of a directly contacting disk drive comprises a pair of coned disks $a$, $b$ mounted with a free endwise movement upon a shaft $c$.

Each of the bosses $d$, $e$ of the disks $a$, $b$ is furnished at the ends thereof and preferably on its opposite sides with cam surfaces $f$, $g$, each in the form of a tandem series of helices as hereinbefore described, and forming with the cam surface on the corresponding side of the companion disk a pair of converging cam surfaces with the individual helices of the same pitch pairing with each other.

The shaft $c$ is fitted with radial stops to coact with such cam surfaces, it being an integral part of the present invention to form these stops so as to realize a surface contact thereof with the cam surfaces and to arrange the working surfaces of the stops automatically adjustable into parallelism with differently pitched faces of the compound helical cam.

In the illustrated embodiment, the opposite radial stops for each component disk consists of a cylindric rod $i$ which is passed transversely through the center of the shaft $c$ and fixed in position by a cross pin $j$. The ends of the rod $i$ are left radially projecting beyond the periphery of the shaft $c$, and each end is fitted with a mutilated roller or rotatable sleeve $k$ which may be secured on the rod $i$ as depicted by a screw nut $l$ fitted upon a screw terminal of the rod $i$.

In cases of employing a mutilated cylindric rotatable member to realize the surface contact aimed at, provision is made to confine the rotation of such member to an amount which shall prevent the flat surface $m$ from moving into a position in which it will fail to interact with the tandem helices.

For example in the embodiment depicted the roller or sleeve $k$ is furnished with a notch $n$ and a cross pin $o$ is fitted in the rod $i$ to engage in the notch $n$, sufficient clearance being apportioned to admit of the amount of rotation of the roller or sleeve $k$ which is necessary for it to adjust itself to the varying pitched helices of the compound helical cam.

In cases where the converging compound helical cam surfaces are furnished in or on a sleeve keyed to the shaft, and the stops are directly combined with the component disks, a similar provision of rotatable mutilated rollers or sleeves will serve.

Interdependent movement of the component disks $a$, $b$ is secured in the non-interpenetrating embodiment selected for illustration by furnishing one disk in known manner with horizontal fingers $p$ which work in like passages provided in the other.

It is convenient structurally to carry the passages for the reception of the finger $p$ through to the end faces of the respective bosses and to utilize the free end portions of such passages for fitting each boss with at least one helical guide $q$ which is illustrated as made of a length of rod suitably bent and is located to be companion to a compound helical cam surface of the boss, the pitch of the guide $q$ being appropriately the mean of the pitches of the compound cam. Such a guide $q$ functions to positively separate the component disks if these and the shaft, according to which is driving, overrun the one in relation to the other, for example, as would occur on an automobile when declutching.

A constructional form of variable velocity ratio drive of the directly contacting disk type which is found to work well is exemplified by Figs. 7 to 9 of the subjoined drawings, this being illustrated as applied to an automobile.

$r$, $s$ designate respectively driving and driven shafts arranged parallel to one another, the one having mounted thereon a disk $t$ and the other having mounted thereon a friction member consisting of two component parts or coned disks $u$, $v$ adapted to frictionally engage the opposite faces of the disk $t$ at a point which will be varied by moving the shaft $s$ toward or away from the shaft $r$; such component parts being constrained in movement on the shaft by stops and cam surfaces formed and interacting as hereinbefore described.

The edges of the disk $t$ are beveled to correspond with the coned faces of the disks $u$, $v$ and thereby to realize a line contact at any instant between the interacting members $t$ and $u$, $v$.

The shafts $r$, $s$ are carried in bearing brackets $w$, $x$ which are borne on cross members $y$ $y$ fixed to the chassis framing, the bracket pair $w$ $w$ being fixed in position and the bracket pair $x$ $x$ being slidingly mounted on the crossmember $y$ $y$. Shaft $r$ is connected to be driven by the engine while shaft $s$ is arranged to drive the rear axle through the instrumentality of a Cardan shaft and the usual differential gearing.

Movement of the shaft $s$ to and from the shaft $r$ may be effected by divers ways. But in the present depicted and preferred arrangement the brackets $x$ $x$ are fixed to an inclined plane member $z$ furnished with a plate $z^1$ which has its working surfaces arranged in stepped formation to furnish locking faces 1, normal to the line of thrust exerted in operation upon the shaft $s$. To co-act with these locking faces a stop 2 is furnished on the horizontal member of an inverted L-shaped slide 3 which works in a guideway 4 which is fixed to the chassis frame and which may be tied for greater strength as by a member 6 to a cross member 11 connecting extensions 5 of the bracket pair $w$ $w$. The gear changing lever 7 is pivotally secured at 12 to the guideway 4 and is furnished with a pin 13 which passes through an arcuate slot 14 in the guideway 4 and through a slot 15 in the slide 3. On actuating the gear changing lever 7 in the direction of the arrow in Fig. 8 the stop 2 will act upon the stepped slope of the plate $z^1$ and thereby move the slide $z$ and the disk $t$ toward the driving shaft $r$ and bring the disk $t$ into engagement with the disks $u$ and $v$. On pulling the lever 7 in the opposite direction, the stop 2 will co-act with and slide over the face 8 of the plate $z^1$ and thereby pull the member $z$ and disk $t$ away from the driving shaft $r$. The usual or any approved quadrant control of the lever 7 will ordinarily be furnished.

A guide 9 furnished with a bearing 10 which slides on one of the cross members $y$ may be fixed to the member $z$ as a precautionary measure to take up any lateral thrust which may arise when the disks $t$ and $u$, $v$ are in engagement.

An arrangement which may be provided for reversing the drive of the rear wheels, comprises a spur wheel 16 fixed to the shaft $s$ and spur wheel 17 secured to the shaft $r$. The bracket $w$ is furnished with an extension 18 which has secured thereto a short shaft 19 carrying an idler 20. The idler is slidably mounted on the shaft 19 and free to rotate around the said shaft, and is further furnished with a recessed bush 22 which is engaged by the forked end of a hand lever not shown. Normally the idler 20 will not be in engagement with the pinion 17, but on actuating the hand lever, in the position of the parts as shown in Fig. 8, the forked end will move the idler into mesh with the pinion 17 and thereby also come into engagement with the spur wheel 16, thus causing the shaft $s$ to be rotated in the opposite direction.

The definite locking of the shaft $s$ by the stop 2 co-acting with the locking faces 1 is preferably such that the stepped slope has a range sufficient to include a positive locking of the shaft as shown when the reverse drive is employed.

In cases where the rotary friction member is desired to drive or be driven in either clockwise or anti-clockwise direction for example in the case of an automobile when it may be expedient to assist the braking appliances of the vehicle by the braking effect of engine compression the tandem series of helices are preceded by a counter helical surface or a series of counter helical surfaces $f^1$ as shown in Fig. 10, whereby if the contacting disk $t$ is set at the position corresponding to the lowest effective diameter of the component disk $u$, $v$, the component disk being driven from the road wheels, the rotary friction members will by the co-action of the stop $k$ and the counter helix $f^1$ be caused to press upon the contacting disk with the desired amount to prevent slip, thereby enabling "braking on compression" to be realized.

By a simple and obvious adaptation a similar application may be made in the case of the herein described directly contacting disk embodiment.

The invention is applicable to variable speed pulleys as pulleys, and obviously is not limited to any particular arrangement of variable velocity ratio friction drives of the character referred to whether of the belt or directly contacting disk type.

The conditions for determining the slope or pitch of the individual helices for a belt drive will obviously vary from those of a directly contacting disk drive. But in any case no difficulty to finding the pitch will be presented to those skilled in the art.

Having thus described my invention what I claim and desire to secure by Letters Patent is:

1. In a speed varying mechanism, in combination, a revolving supporting member; a rotary friction element effective at varying diameters mounted on said supporting member to revolve therewith while capable of being displaced therealong; a companion member adapted to make contacting engagement with said rotary element at any and each of its effective diameters; interacting means associated with said rotary element and with said supporting member for constraining the rotary element in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

2. In a speed varying mechanism, in combination, a revolving supporting member; a rotary friction element effective at varying diameters mounted on said supporting member to revolve therewith while capable of being displaced therealong; a companion member adapted to make contacting engagement with said rotary element at any and each of its effective diameters; interacting means associated with said rotary element and with said supporting member for constraining the rotary element in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop an appropriate part of which is formed with a flat or substantially flat surface for contacting with the helical surfaces the said stop-part being rotatable or adjustable with respect to the tandem series of helical surfaces to bring the said contacting surface of the stop-part into surface contact with any and each of the said helical surfaces.

3. In a speed varying mechanism, in combination, a revolving supporting member; a rotary friction member having separable component elements effective at varying diameters mounted on said supporting member to revolve therewith while capable of being displaced therealong; a companion member adapted to make contacting engagement with the component elements of said rotary member at any and each of its effective diameters; interacting means associated with said component elements and with said supporting member for constraining the component elements in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

4. In a speed varying mechanism, in combination, a revolving supporting member; a rotary friction member having separable component elements effective at varying diameters mounted on said supporting member to revolve therewith while capable of being displaced therealong; a companion member adapted to make contacting engagement with the component elements of said rotary member at any and each of its effective diameters; interacting means associated with said component elements and with said supporting member for constraining the component elements in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop an appropriate part of which is formed with a flat or substantially flat surface for contacting with the helical surfaces the said stop-part being rotatable or adjustable with respect to the tandem series of helical surfaces to bring the said contacting surface of the stop-part into surface contact with any and each of the said helical surfaces.

5. A variable speed power transmission device for a revolving supporting member; said device comprising a rotary friction disk mounted on said supporting member to revolve therewith while capable of being displaced therealong; interacting means associated with said rotary friction disk and with said supporting member for constraining the rotary friction disk in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

6. A variable speed power transmission device for a revolving supporting member; said device comprising a rotary friction disk mounted on said supporting member to revolve therewith while capable of being displaced therealong; interacting means associated with said rotary friction disk and with said supporting member for constraining the rotary friction disk in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop an appropriate part of which is formed with a flat or substantially flat surface for contacting with the helical surfaces the said stop-part being rotatable or adjustable with respect to the tandem series of helical surfaces to bring the said contacting surface of the stop-part into surface contact with any and each of the said helical surfaces.

7. A variable speed power transmission friction device for a revolving supporting member; said device comprising a rotary friction member having separable component elements effective at varying diameters mounted on said supporting member to revolve therewith while capable of being displaced therealong; interacting means associated with said rotary friction member and with said supporting member for constraining the rotary friction member in said movement upon the supporting member, said interacting means being effective by relative rotary motion thereof about the axis of the said supporting member and comprising a tandem series of dissimilar flat or substantially flat helical surfaces which vary in pitch to correspond to a series of different speeds and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

8. A variable speed power transmission friction device for a revolving supporting member; said device comprising a rotary friction member having separable component elements effective at varying diameters mounted on said supporting member to revolve therewith while capable of being displaced therealong; interacting means associated with said rotary friction member and with said supporting member for constraining the rotary friction member in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop an appropriate part of which is formed with a flat or substantially flat surface for contacting with the helical surfaces the said stop-part being rotatable or adjustable with respect to the tandem series of helical surfaces to bring the said contacting surface of the stop-part into surface contact with any and each of the said helical surfaces.

9. An expansible friction member comprising a revolving supporting member; separable companion coned disks mounted on said supporting member to revolve therewith while capable of being displaced therealong; interacting means associated with said disks and with said supporting member for constraining the disks in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

10. An expansible friction member comprising a revolving supporting member; separable companion coned disks mounted on said supporting member to revolve therewith while capable of being displaced therealong; interacting means associated with said disks and with said supporting member for constraining the disks in said movement upon the supporting member, said interacting means being effective by relative rotary motion thereof about the axis of said supporting member and comprising a tandem series of dissimilar flat or substantially flat helical surfaces which vary in pitch to correspond to a series of different speeds and a co-acting stop an appropriate part of which is formed with a flat or substantially flat surface for contacting with the helical surfaces the said stop-part being rotatable or adjustable with respect to the tandem series of helical surfaces to bring the said contacting surface of the stop-part into surface contact with any and each of said helical surfaces.

11. The combination with a revolving supporting element of a rotary friction element mounted on said supporting element to revolve therewith while capable of being moved into different positions therealong, a shoulder in the form of a tandem series of dissimilar flat or substantially flat helical surfaces which vary in pitch to correspond to a series of different speeds disposed around the axis of rotation and associated with one of said elements, and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

12. The combination with a revolving supporting element, of an expansible rotary friction element effective at varying diameters mounted on said supporting element to revolve therewith while capable of being moved into different positions therealong; a shoulder in the form of a tandem series of dissimilar flat or substantially flat helical surfaces which vary in pitch to correspond to a series of different speeds disposed around the axis of rotation and associated with one of said elements, and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

13. The combination with a revolving supporting member having separable component elements mounted on the supporting member to move toward and from each other while capable of revolving with said supporting member, convergently disposed shoulders each in the form of a tandem series of dissimilar flat or substantially flat helical surfaces which vary in pitch to correspond to a series of different speeds disposed around the axis of rotation and associated with one of said members, and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

14. The combination with a revolving supporting element, of a rotary friction element mounted on said supporting element to revolve therewith while capable of being moved into different positions therealong, a shoulder in the form of a tandem series of dissimilar flat or substantially flat helical surfaces which vary in pitch to correspond to a series of different speeds and a counter helical surface disposed around the axis of rotation and associated with one of said elements, and a co-acting stop formed with a flat or substantially flat surface for contacting with the helical surfaces the said stop being rotatable or adjustable with respect to the tandem series of helical surfaces to bring the said contacting surface of the stop into surface contact with any and each of the said helical surfaces.

15. In a speed varying mechanism, in combination, a frame, a revolving supporting member, a rotary friction member mounted on the said supporting member to move into different positions therealong while capable of revolving therewith, means carried by one of the said members in the form of a tandem series of dissimilar helical surfaces and a surface contact producing stop carried by the other of said members and bearing against the said means, the stop being movable to bring its working surface into parallelism with any and each of the differently pitched faces of the compound helical means, a second revolving supporting member, a companion member mounted thereon said companion member adapted in operation to frictionally engage the said rotary friction member at a point which can be varied, means for approximating or separating the friction member and companion member, and means comprising a pin and a stepped slope for positively maintaining the members in the adjusted position.

16. In a speed varying mechanism, in combination, a frame, a revolving supporting member, a rotary friction member mounted on the said supporting member to move into different positions therealong while capable of revolving therewith, means carried by one of said members in the form of a tandem series of dissimilar flat or substantially flat helical surfaces and a co-acting stop formed with a flat or substantially flat surface for contacting with the helical surfaces carried by the other of said members, the stop being movable or adjustable with respect to the tandem series of helical surfaces to bring the said contacting surface of the stop into surface contact with any and each of the said helical surfaces, a second revolving supporting member, a companion member mounted thereon, said companion member adapted in operation to frictionally engage the said rotary friction member at a point which can be varied, means for approximating or separating the friction member and companion member, and means for positively maintaining the members in the adjusted position.

17. The combination with a revolving supporting member, of a rotary friction member mounted on the supporting member to be movable therealong while capable of revolving therewith, means in the form of a tandem series of dissimilar flat or substantially flat helical surfaces and a flat or substantially flat counter helical surface associated with one of said members and a co-acting stop formed with a flat or substantially flat surface for contacting with the helical surfaces carried by the other of said members, the said stop being movable or adjustable with respect to the helical surfaces to bring the said contacting surface of the stop into surface contact with any and each one of the said helical surfaces.

18. The combination with a revolving supporting member, of a member having spaced portions mounted on the supporting member and movable axially therealong toward or away from each other, means carried by one of said members in the form of a tandem series of dissimilar flat or substantially flat helices, and co-acting stops each formed with a flat or substantially flat surface for contacting with the helical surfaces carried by the other of said members the said stops being movable or adjustable with respect to the helical surfaces to bring the said contacting surfaces of the stops into surface contact with any and each one of their respective tandem series of helical surfaces.

19. Shift mechanism for a directly contacting variable speed power transmission mechanism of the kind described; said shift mechanism comprising a slide, a stepped slope associated with said slide and a stop acting conjointly with said slope to first actuate said slide and thereafter positively lock the slide in any and each of its adjusted positions.

20. Shift mechanism for a directly contacting variable speed power transmission mechanism of the kind described, said shift mechanism comprising a slide, a stepped slope associated with said slide, a stop acting conjointly with said slope to first actuate said slide and thereafter to positively lock the slide in any and each of its adjusted positions and a second slope associated with said slide and adapted to act conjointly with said stop to move the slide in the opposite direction to the first mentioned actuation.

In testimony whereof I affix my signature in presence of two witnesses.

T. J. F. RYLAND.

Witnesses:
  ALBERT G. BARNES,
  ARTHUR DREICHLINGER.